United States Patent Office 2,895,830
Patented July 21, 1959

2,895,830
SOW MILK SUBSTITUTE

Walter Hans George Roe, Gentofte, Denmark, assignor to Aktieselskabet Kemovit, Copenhagen, Denmark, a firm No Drawing. Application October 18, 1954
Serial No. 463,039

Claims priority, application Great Britain June 17, 1954

7 Claims. (Cl. 99—7)

This invention relates to a substitute for sow milk to be used in the rearing of piglets.

In modern pig farming, the best economical results are obtained if the breeding animals can be spared from suckling the piglets because then they can be mated sooner thus giving birth about three times a year instead of only twice.

For this and other reasons a demand is created for a feed which can replace the natural sow milk, and it is an object of the present invention to provide for such a sow milk substitute.

It has been proposed to feed the piglets on cow milk to which a small proportion of citric acid is added, and in some cases enriched by cream, the citric acid making the cow milk better digestible. However, this feed is not ideal and the lethality of piglets reared on it is fairly high.

Therefore, I prefer to make my improved sow milk substitute from a mixture of fats, carbohydrates and proteins. Preferably, this mixture should be in proportions as nearly equal as possible to those of natural sow milk and supplemented with nutrient salts and vitamins in order to cover the piglets' need of these substances.

In selecting the components of my improved sow milk substitute, I choose such as are easily digestible to the piglets, and particular care is taken to select the proteins so as to give the most economical utilization of the feed, the proteins usually being the most costly of the raw materials.

By the digestion the proteins are degraded to amino acids which are again built up to form the pig's natural proteins and the best utilization of the proteins is for such re-building and not for energy production. Thus, the proteins should be chosen with this object in view, and according to this invention a sow milk substitute contains blood plasma, as the protein source.

According to a preferred embodiment of the invention the blood plasma is porcine. In porcine blood plasma almost all protein is easily digestible and naturally the proportions of the amino acids from which the proteins are built up are such as to give the best possible utilization by the piglets. Further, it is believed that porcine blood plasma contains a number of anti-bodies useful to prevent diseases in the piglets.

For the carbohydrate component of my improved sow milk substitute, I use rolled oats which before the rolling have been subjected to heating and steaming.

A suitable treatment may for instance be steaming with saturated steam at atmospheric pressure just before the rolling. I may also use steaming with saturated steam of temperatures up to 150° C. under pressure, the pressure being let off before rolling.

Oat groats and oatmeal are generally considered particularly valuable as a feed for young pigs because of their low fiber content which makes for easy digestibility, but I have found that by using steam treated rolled oats, such as are generally produced for human consumption, the digestibility is greatly improved over the common oat groats and oatmeal. I think that this is due to a partial degradation of the cell walls and of the starch in the kernels.

The fats used in my composition may be of animal or vegetable origin. Thus, I may use lard, lard oil, marine fats, such as whale oil or fish oil, soy oil and other vegetable oils, to which I add a suitable proportion of anti-oxydants, such as NDGA, gallates or citric acid. Other anti-oxydants, which may also be used, are butylated hydroxyanisole (BHA), tocopherols and gum guaiac.

In preparing my sow milk substitute, I prefer first to mix the rolled oats, dried blood plasma and minerals intimately, for instance in a ball mill. The mixed product is then passed to a dry-batch mixer where the melted fats at 70–80° C. with added anti-oxydants are sprayed onto the agitated mixture. After cooling, I add a balanced vitamin mixture, and I may further add antibiotics, such as penicillin, aureomycin or terramycin in suitable proportions. For instance, I may add some 50,000 to 100,000 international units of penicillin per kilogram of the mixture.

For use, the said mixture is stirred into acidified skim milk or butter milk, or mixtures of these with water. I may also admix dried milk (from full milk, acidified skim milk or butter milk) in the proportions of two parts of the above mixture to one part of dried milk, in which case the resulting product is stirred with water only.

The following example serves to illustrate the composition of my sow milk substitute, it being understood that variations of the components are possible as indicated above.

Example

The following substances are mixed as described above, the parts being by weight:

| | Parts |
|---|---|
| Lard | 2–5 |
| Lard oil | 5–8 |
| Dried porcine blood plasma | 5–8 |
| Rolled oats | 75–85 |
| Mineral salts | 3–4 |

The mineral salts may be composed as follows:

| | Parts |
|---|---|
| Dicalcium phosphate | 575 |
| Chalk | 25 |
| Common salt | 25 |
| Iron lactate | 8 |
| Manganese sulphate | 4 |
| Copper sulphate | 3 |
| Zinc sulphate | 2 |
| Potassium sulphate | 2 |
| Cobalt sulphate | 1 |
| Magnesium sulphate | 1 |

To 30 parts by weight of the mixture of fats, proteins, carbohydrates and mineral salts, 1 part by weight of a balanced vitamin mixture, containing 2000 international units of penicillin per gram, is added.

1 kilogram of the resulting mixture is stirred with 6 liters of acidified skim milk or butter milk and 1 liter of water to make a suitable liquid feed for the piglets.

I may also mix 2 kilograms of the resulting mixture with 1 kilogram of dried skim milk and stir the resulting product into 15 liters of water.

The following practical test illustrates the results obtained by feeding piglets with my sow milk substitute.

Of a litter of 15 piglets, 3 days after the birth 7 with a total weight of 10.5 kilograms were taken from the sow and fed with the sow milk substitute of my invention, the other 8 with a total weight of 11.8 kilograms remaining by the sow. After 23 days the total weight of the 7 removed piglets was 44 kilograms, whereas the 8 remaining by the sow weighed only 38.5 kilograms. The removed piglets all thrived well and no stomach difficulties were observed.

I claim:

1. A sow milk substitute composition consisting essentially of fats, carbohydrates and proteins in which the carbohydrates are derived from rolled oats, the fats are absorbed on the carbohydrates, and porcine blood plasma forms the main part of the proteins, the components being present in proportions to form a sow milk substitute.

2. A sow milk substitute composition as set forth in claim 1 containing nutrient salt and vitamins and the carbohydrates being supplied by rolled steamed oats.

3. A sow milk substitute composition consisting essentially of from 7 to 13 parts by weight of fats and fatty oils, from 5 to 8 parts by weight of dried porcine blood plasma, from 75 to 85 parts by weight of rolled oats, and from 3 to 4 parts by weight of a balanced mixture of nutrient mineral salts.

4. The sow milk substitute of claim 3, which is further supplied with a balanced vitamin mixture in the proportions of 1 part by weight of vitamin mixture to 30 parts by weight of the non-vitaminized sow milk substitute, and with an antibiotic selected from the group consisting of penicillin, aureomycin and terramycin.

5. A suspension of 1 part by weight of the sow milk substitute of claim 4 in 5 parts by weight of acidified skim milk and 1 part by weight of water.

6. A sow milk substitute composition consisting essentially of a mixture of 7 to 13 parts by weight of fats and fatty oils, from 5 to 8 parts by weight of dried porcine blood plasma, from 75 to 85 parts by weight of rolled oats, from 3 to 4 parts by weight of a balanced mixture of nutrient mineral salts, from 40 to 60 parts by weight of dry milk, said mixture containing a balanced supply of vitamins, and 1500 to 2500 international units of penicillin per gram.

7. A suspension of 1 part by weight of the sow milk substitute of claim 6 in 5 parts by weight of water.

References Cited in the file of this patent

UNITED STATES PATENTS

| 2,575,175 | Kronisch | Nov. 13, 1951 |
| 2,703,285 | Luther | Mar. 1, 1955 |

FOREIGN PATENTS

| 10,995 | Great Britain | of 1886 |